(12) United States Patent
Davidson et al.

(10) Patent No.: US 8,126,201 B2
(45) Date of Patent: Feb. 28, 2012

(54) WATERMARK DECODING FROM STREAMING MEDIA

(75) Inventors: Clayton L. Davidson, Lake Oswego, OR (US); Aruna B. Kumar, Camas, WA (US)

(73) Assignee: Digimarc Corporation, Beaverton, OR (US)

( * ) Notice: Subject to any disclaimer, the term of this patent is extended or adjusted under 35 U.S.C. 154(b) by 67 days.

(21) Appl. No.: 12/698,651

(22) Filed: Feb. 2, 2010

(65) Prior Publication Data

US 2011/0033081 A1 Feb. 10, 2011

Related U.S. Application Data

(63) Continuation of application No. 11/244,429, filed on Oct. 4, 2005, now Pat. No. 7,657,057, which is a continuation of application No. 09/659,125, filed on Sep. 11, 2000, now Pat. No. 6,952,485.

(51) Int. Cl.
 *G06K 9/00* (2006.01)

(52) U.S. Cl. ........ 382/100; 382/181; 382/190; 382/232; 382/305; 382/307

(58) Field of Classification Search ................. 382/100, 382/181, 190, 232, 305, 307
See application file for complete search history.

(56) References Cited

U.S. PATENT DOCUMENTS

| | | | |
|---|---|---|---|
| 5,613,004 A * | 3/1997 | Cooperman et al. | ............ 380/28 |
| 5,761,686 A | 6/1998 | Bloomberg | |
| 5,841,978 A | 11/1998 | Rhoads | |
| 5,862,260 A | 1/1999 | Rhoads | |
| 5,901,178 A | 5/1999 | Lee et al. | |
| 5,926,624 A * | 7/1999 | Katz et al. | ............ 709/217 |
| 5,960,081 A | 9/1999 | Vynne et al. | |
| 6,009,176 A * | 12/1999 | Gennaro et al. | ............ 713/170 |
| 6,122,403 A | 9/2000 | Rhoads | |
| 6,208,745 B1 | 3/2001 | Florencio et al. | |
| 6,229,924 B1 | 5/2001 | Rhoads et al. | |
| 6,285,774 B1 | 9/2001 | Schumann et al. | |
| 6,307,949 B1 | 10/2001 | Rhoads | |
| 6,311,214 B1 | 10/2001 | Rhoads | |
| 6,311,271 B1 | 10/2001 | Gennaro | |
| 6,374,336 B1 | 4/2002 | Peters et al. | |
| 6,381,341 B1 | 4/2002 | Rhoads | |
| 6,385,329 B1 | 5/2002 | Sharma et al. | |
| 6,389,421 B1 | 5/2002 | Hawkins et al. | |

(Continued)

FOREIGN PATENT DOCUMENTS

EP 0 789 270 8/1997

(Continued)

OTHER PUBLICATIONS

U.S. Appl. No. 09/343,104, filed Jun. 29, 1999, Tony F. Rodriguez, et al.

(Continued)

*Primary Examiner* — Wesley Tucker

(57) ABSTRACT

This patent document details, e.g., claims and systems for watermark decoding from streaming media signals. One claim recites an apparatus comprising: electronic memory for buffering a streaming media signal; one or more electronic processors programmed for: ranking buffered portions of the media signal in terms of their ability to hide steganographic indicia; detecting steganographic indicia from relatively higher-ranked portions of the streaming media signal before attempting to detect from relatively lower-ranked portions; and carrying out an action based at least in part on detection of the steganographic indicia. Of course, other claims and disclosure are provided too.

23 Claims, 3 Drawing Sheets

U.S. PATENT DOCUMENTS

| | | |
|---|---|---|
| 6,389,467 B1 | 5/2002 | Eyal |
| 6,408,082 B1 | 6/2002 | Rhoads et al. |
| 6,411,392 B1 | 6/2002 | Bender et al. |
| 6,421,070 B1 | 7/2002 | Ramos et al. |
| 6,424,725 B1 | 7/2002 | Rhoads et al. |
| 6,442,284 B1 | 8/2002 | Gustafson et al. |
| 6,456,725 B1 | 9/2002 | Cox et al. |
| 6,470,090 B2 | 10/2002 | Oami et al. |
| 6,473,516 B1 | 10/2002 | Kawaguchi et al. |
| 6,493,457 B1 | 12/2002 | Quackenbush |
| 6,505,160 B1 | 1/2003 | Levy et al. |
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,541 B1 | 4/2003 | Luna et al. |
| 6,542,927 B2 | 4/2003 | Rhoads |
| 6,549,638 B2 | 4/2003 | Davis et al. |
| 6,553,127 B1 | 4/2003 | Kurowski |
| 6,553,129 B1 | 4/2003 | Rhoads |
| 6,556,688 B1 | 4/2003 | Ratnakar |
| 6,563,935 B1 | 5/2003 | Echizen et al. |
| 6,567,533 B1 | 5/2003 | Rhoads |
| 6,580,808 B2 | 6/2003 | Rhoads |
| 6,590,996 B1 | 7/2003 | Reed et al. |
| 6,609,105 B2 | 8/2003 | Van Zoest et al. |
| 6,611,607 B1 | 8/2003 | Davis et al. |
| 6,611,830 B2 | 8/2003 | Shinoda et al. |
| 6,614,914 B1 | 9/2003 | Rhoads et al. |
| 6,647,128 B1 | 11/2003 | Rhoads |
| 6,647,130 B2 | 11/2003 | Rhoads |
| 6,650,761 B1 | 11/2003 | Rodriguez et al. |
| 6,674,876 B1 | 1/2004 | Hannigan et al. |
| 6,674,886 B2 | 1/2004 | Davis et al. |
| 6,681,028 B2 | 1/2004 | Rodriguez et al. |
| 6,681,029 B1 | 1/2004 | Rhoads |
| 6,684,249 B1 | 1/2004 | Frerichs |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,724,914 B2 | 4/2004 | Brundage et al. |
| 6,760,463 B2 | 7/2004 | Rhoads |
| 6,763,123 B2 | 7/2004 | Reed et al. |
| 6,768,809 B2 | 7/2004 | Rhoads et al. |
| 6,775,391 B2 | 8/2004 | Hosaka |
| 6,775,392 B1 | 8/2004 | Rhoads |
| 6,798,894 B2 | 9/2004 | Rhoads |
| 6,813,366 B1 | 11/2004 | Rhoads |
| 6,829,368 B2 | 12/2004 | Meyer et al. |
| 6,871,180 B1 | 3/2005 | Neuhauser et al. |
| 6,879,701 B1 | 4/2005 | Rhoads |
| 6,917,724 B2 | 7/2005 | Seder et al. |
| 6,920,232 B2 | 7/2005 | Rhoads |
| 6,931,451 B1 | 8/2005 | Logan et al. |
| 6,947,571 B1 | 9/2005 | Rhoads et al. |
| 6,952,485 B1 | 10/2005 | Davidson et al. |
| 6,971,011 B1 | 11/2005 | Maes |
| 6,975,746 B2 | 12/2005 | Davis et al. |
| 6,987,862 B2 | 1/2006 | Rhoads |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,013,021 B2 | 3/2006 | Sharma et al. |
| 7,024,016 B2 | 4/2006 | Rhoads et al. |
| 7,027,614 B2 | 4/2006 | Reed |
| 7,031,491 B1 | 4/2006 | Donescu et al. |
| 7,035,427 B2 | 4/2006 | Rhoads |
| 7,042,470 B2 | 5/2006 | Rhoads et al. |
| 7,043,049 B2 | 5/2006 | Kuzma |
| 7,044,395 B1 | 5/2006 | Davis et al. |
| 7,047,557 B2 | 5/2006 | Enomoto |
| 7,051,086 B2 | 5/2006 | Rhoads et al. |
| 7,054,465 B2 | 5/2006 | Rhoads |
| 7,062,069 B2 | 6/2006 | Rhoads |
| 7,095,871 B2 | 8/2006 | Jones et al. |
| 7,111,170 B2 | 9/2006 | Rhoads et al. |
| 7,113,614 B2 | 9/2006 | Rhoads |
| 7,123,718 B1 | 10/2006 | Moskowitz et al. |
| 7,139,408 B2 | 11/2006 | Rhoads et al. |
| 7,151,854 B2 | 12/2006 | Shen |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,213,757 B2 | 5/2007 | Jones et al. |
| 7,224,819 B2 | 5/2007 | Levy et al. |
| 7,248,717 B2 | 7/2007 | Rhoads |
| 7,261,612 B1 | 8/2007 | Hannigan et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,333,957 B2 | 2/2008 | Levy et al. |
| 7,369,678 B2 | 5/2008 | Rhoads |
| 7,377,421 B2 | 5/2008 | Rhoads |
| 7,389,420 B2 | 6/2008 | Tian |
| 7,391,880 B2 | 6/2008 | Reed et al. |
| 7,406,214 B2 | 7/2008 | Rhoads et al. |
| 7,421,628 B2 | 9/2008 | Wright et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,480,393 B2 | 1/2009 | Gustafson et al. |
| 7,486,799 B2 | 2/2009 | Rhoads |
| 7,502,759 B2 | 3/2009 | Hannigan et al. |
| 7,508,955 B2 | 3/2009 | Carr et al. |
| 7,515,730 B2 | 4/2009 | Tian et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,562,392 B1 | 7/2009 | Rhoads |
| 7,564,992 B2 | 7/2009 | Rhoads |
| 7,567,721 B2 | 7/2009 | Alattar et al. |
| 7,574,014 B2 | 8/2009 | Sharma et al. |
| 7,577,841 B2 | 8/2009 | Celik |
| RE40,919 E | 9/2009 | Rhoads |
| 7,602,978 B2 | 10/2009 | Levy et al. |
| 7,607,016 B2 | 10/2009 | Brunk et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,057 B2 | 2/2010 | Davidson et al. |
| 7,657,058 B2 | 2/2010 | Sharma |
| 7,684,623 B2 | 3/2010 | Shen et al. |
| 7,685,426 B2 | 3/2010 | Ramos et al. |
| 7,693,300 B2 | 4/2010 | Reed et al. |
| 7,693,965 B2 | 4/2010 | Rhoads |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,778,441 B2 | 8/2010 | Davis et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 7,945,781 B1 | 5/2011 | Rhoads |
| 7,949,147 B2 | 5/2011 | Rhoads et al. |
| 7,953,270 B2 | 5/2011 | Rhoads |

| | | |
|---|---|---|
| 7,953,824 B2 | 5/2011 | Rhoads et al. |
| 7,957,552 B2 | 6/2011 | Gustafson et al. |
| 2001/0026616 A1 | 10/2001 | Tanaka |
| 2001/0034705 A1 | 10/2001 | Rhoads et al. |
| 2001/0055407 A1 | 12/2001 | Rhoads |
| 2001/0055408 A1 | 12/2001 | Reefman |
| 2002/0009208 A1 | 1/2002 | Alattar et al. |
| 2002/0082922 A1 | 6/2002 | Van Zoest |
| 2002/0090111 A1 | 7/2002 | Fukushima et al. |
| 2002/0120849 A1 | 8/2002 | McKinley et al. |
| 2002/0131076 A1 | 9/2002 | Davis |
| 2002/0140857 A1 | 10/2002 | Limaye |
| 2002/0167427 A1 | 11/2002 | Furuta |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0002672 A1 | 1/2003 | Beekmans et al. |
| 2003/0040957 A1 | 2/2003 | Rhoads et al. |
| 2003/0081777 A1 | 5/2003 | Brondijk et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0177361 A1 | 8/2005 | Srinivasan |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0091066 A1 | 4/2011 | Alattar |

FOREIGN PATENT DOCUMENTS

| | | |
|---|---|---|
| WO | WO01/06755 | 1/2001 |
| WO | WO0217633 | 2/2002 |
| WO | WO 02/065753 | 8/2002 |

OTHER PUBLICATIONS

U.S. Appl. No. 09/343,101, filed Jun. 29, 1999, Bruce L. Davis, et al.

U.S. Appl. No. 09/413,117, filed Oct. 6, 1999, Geoffrey B. Rhoads.

U.S. Appl. No. 09/465,418, filed Dec. 16, 1999, Geoffrey B. Rhoads, et al.

U.S. Appl. No. 09/482,749, filed Jan. 13, 2000, Geoffrey B. Rhoads.

U.S. Appl. No. 09/507,096, filed Feb. 17, 2000, Geoffrey B. Rhoads, et al.

U.S. Appl. No. 09/552,998, filed Apr. 19, 2000, Tony F. Rodriguez, et al.

U.S. Appl. No. 09/567,405, filed May 8, 2000, Geoffrey B. Rhoads, et al.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/689,289, filed Oct. 11, 2000, Geoffrey B. Rhoads, et al.

U.S. Appl. No. 09/697,009, filed Oct. 25, 2000, Bruce L. Davis, et al.

U.S. Appl. No. 09/697,015, filed Oct. 25, 2000, Bruce L Davis, et al.

U.S. Appl. No. 13/084,981, filed Apr. 12, 2011, Geoffrey B. Rhoads.

Alattar, "Smart Images" Using Digimarc's Watermarking Technology, SPIE's 12.sup.th Symposium on Electronic Imaging, Jan. 25, 2000, vol. 3971, No. 25, 10 pages.

Dautzenberg, "Watermarking Images," Department of Microelectronics and Electrical Engineering, Trinity College Dublin, 58 pages, Oct. 1994.

Avcibas, et al., "Steganalysis of Watermarking Techniques Using Image Quality Metrics," Proceedings of SPIE, Jan. 2001, vol. 4314, pp. 523-531.

Debes et al., "Watermarking Scheme for Large Images Using Parallel Processing," Proc. of SPIE vol. 4314 (2001), pp. 26-34.

Hernandez et al., "Statistical Analysis of Watermarking Schemes for Copyright Protection of Images," Proceedings of the IEEE, vol. 87, No. 7, Jul. 1999, pp. 1142-1166.

Jul. 14, 2009 Reply Brief; May 20, 2009 Examiner's Answer; Feb. 27, 2009 Appeal Brief; Jul. 7, 2008 Appeal Brief; Dec. 4, 2007 Final Rejection; all from assignee's U.S. Appl. No. 10/053,488 (published as US 2002-0120849 A1).

* cited by examiner

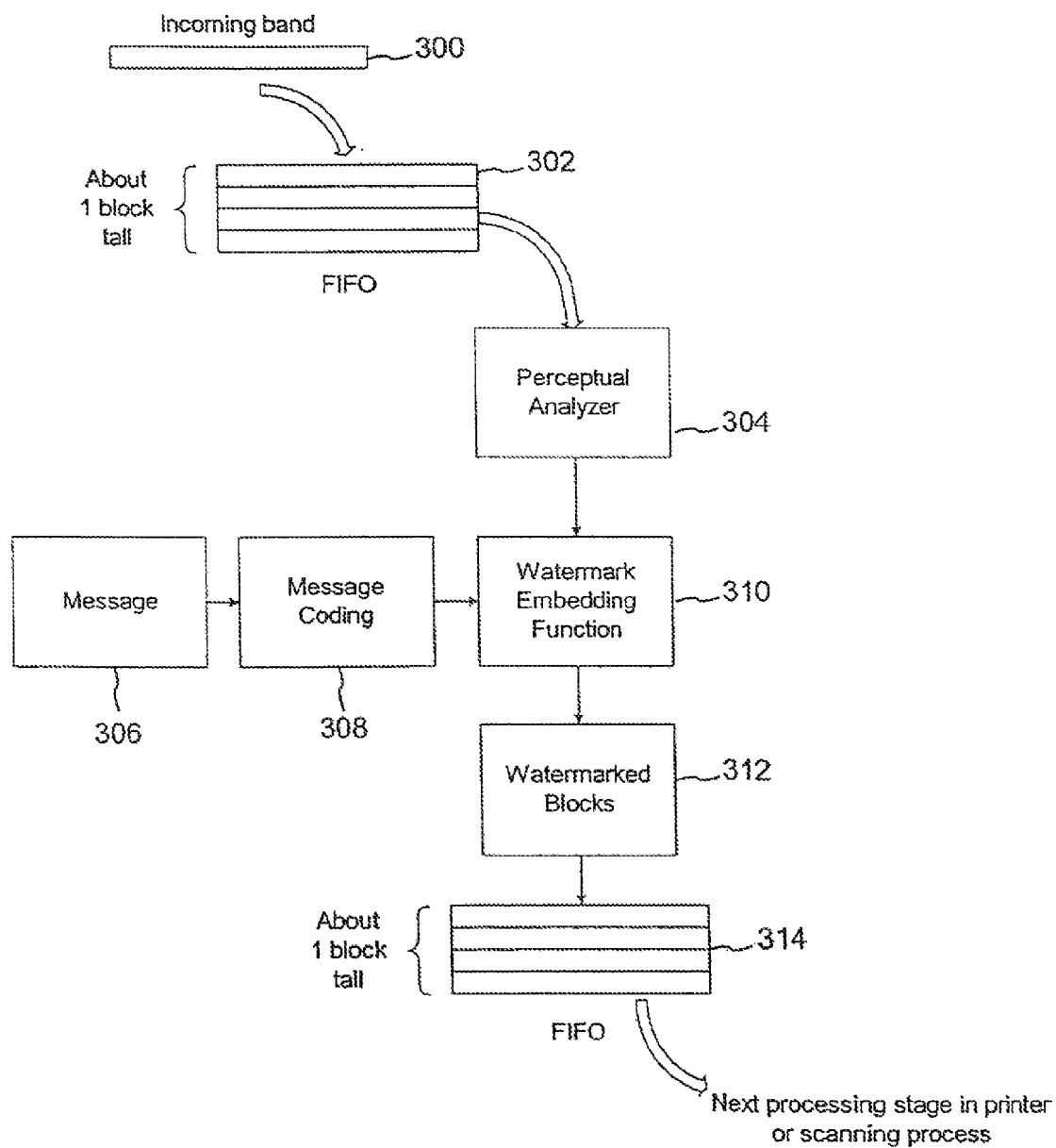

WATERMARK DECODING FROM STREAMING MEDIA

RELATED APPLICATION DATA

This patent application is a continuation of U.S. patent application Ser. No. 11/244,429, filed Oct. 4, 2005 (U.S. Pat. No. 7,657,057), which is a continuation of U.S. patent application Ser. No. 09/659,125, filed Sep. 11, 2000 (U.S. Pat. No. 6,952,485). This patent application is related to U.S. patent application Ser. No. 09/428,359, filed Oct. 28, 1999 (now U.S. Pat. No. 6,674,886), which is a division of application Ser. No. 09/185,380, filed Nov. 3, 1998 (now U.S. Pat. No. 6,549,638). A PCT counterpart of the '380 application has been published as WIPO publication WO0026749. This patent application is also related to pending application Ser. No. 09/465,418, filed Dec. 16, 1999, which claims priority benefit to provisional application 60/112,955, filed Dec. 18, 1998. The subject matter of the present application is related to that disclosed in U.S. Pat. No. 5,862,260, and in application Ser. No. 09/503,881, filed Feb. 14, 2000 (now U.S. Pat. No. 6,614,914); which are hereby incorporated by reference.

TECHNICAL FIELD

The invention relates to digital watermarking technology, and specifically relates to incorporating such technology in imaging devices such as scanners and printers and interfaces for these devices.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 (now U.S. Pat. No. 6,614,914) and U.S. Pat. No. 5,862,260, which are hereby incorporated by reference.

The invention relates to watermark encoding and decoding in imaging devices, such as printers and scanners, and imaging device interfaces. One aspect of the invention is a method and system for image watermark decoding in a print process pipeline. The method performs watermark decoding on an image as it is being transferred from one stage of a printing process to another. In particular, in one implementation, a streaming mode watermark decoder operates on sequential portions of the image in a sequential stream passing from one stage of a print process to another. The streaming mode decoder may be incorporated in a printer driver in a computer connected to a printer peripheral or within a printer device.

This type of watermark decoder can be incorporated into a printer driver or printer device for a variety of applications. One application is counterfeit deterrence. Specifically, the decoder can be used to detect a watermark in a high value document (e.g., bank note, check, authentication label, ticket, identity document, etc.) as it is being printed and inhibit the printing process so that printer output is incomplete. Another application is to associate the image being printed with metadata and to render that metadata during the print process. The watermark includes metadata or a reference to metadata in an external database (either within the printer system or in a remote database via a network connection, e.g., on the Internet). Rendering the metadata may include displaying information and/or executing some program or hardware function associated with the image being printed, such as fetching and rendering a related web page referenced via the watermark message.

Another aspect of the invention is a method and system for image watermark encoding in a print process pipeline. The method performs watermark encoding on an image as it is being transferred from one stage of a printing process to another. In particular, in one implementation, a streaming mode watermark encoder operates on sequential portions of the image in a sequential stream passing from one stage to another. This type of encoder can be incorporated into a printer driver or printer device for a variety of applications.

One application is to encode user information as a document is being printed. This user information may be used for counterfeit deterrence by embedding tracer information in the document that will help identify the maker of the counterfeit document. Another application is to associate other forms of metadata about the document as it is being printed by embedding the metadata or a reference to the metadata in a watermark.

Yet another aspect of the invention is a method and system for image watermark decoding in a scanner pipeline. The method performs watermark decoding on an image as it is being transferred from one stage of a scanning process to another. In particular, in one implementation, a streaming mode watermark decoder operates on sequential portions of the image in a sequential stream passing from one stage to another. This type of decoding can be used for a variety of applications, including those mentioned previously for printer drivers and devices. In particular, it can be used to discontinue the unauthorized image scan of a high value document, such as a bank note, identify document, ticket, check, etc. Further, information decoded from the watermark may include metadata or a reference to metadata in an external database. Upon decoding this information, the watermark decoder fetches and renders the metadata.

Yet another aspect of the invention is a method and system for image watermark encoding in a scanner pipeline. The method performs watermark encoding on an image as it is being transferred from one stage of a scanning process to another. In particular, in one implementation, a streaming mode watermark encoder operates on sequential portions of the image in a sequential stream passing from one stage to another. This type of decoding can be used for a variety of applications, including those mentioned previously for printer drivers and devices. One application is to encode user information in an image before it is transmitted to another process or application. For example, in fax machines, the encoder may be used to embed information about the sender or receiver of a fax image in the image before transmitting the image over a telephone connection.

By incorporating watermark functions in imaging devices or their drivers, these functions are inherently available for many software processes or hardware devices that communicate with the imaging devices.

Further features will become apparent with reference to the following detailed description and accompanying drawings.

BRIEF DESCRIPTION OF THE DRAWINGS

FIG. 3 is a diagram of a streaming mode watermark encoder.

DETAILED DESCRIPTION

There are a number of applications where it is advantageous to incorporate image watermark encoding and decoding functions into imaging devices, such as scanners and printers, and interfaces of these devices, such as software drivers. One application is counterfeit deterrence where watermarks are used to deter reproduction of high value documents such as bank notes, identity documents, packaging, labels, certificates of authentication, tickets, etc. Another application is to use information conveyed in a watermark to control use, transfer or rendering of a watermarked image. Yet another application is to associate metadata with an image.

To incorporate these watermarking applications in imaging devices and their interfaces, it is beneficial to be able to perform watermarking operations in a streaming mode on portions of an image as it is being scanned or printed. In this context, streaming mode refers to a type of watermark function that operates on sequential portions of an image as these portions are being transferred from one process or device to another. It is typical, for example, for software drivers to pass sequential portions of an image to a printer for printing. Similarly, it is typical for software drivers of a scanner to receive sequential portions of an image from a scanning device. In many cases, it is necessary or beneficial for watermark functions to operate on a sequential portion of an image without re-accessing image data that has previously passed and to complete operation on one portion before beginning the same operation on the next portion in a sequential stream.

Figure 1:
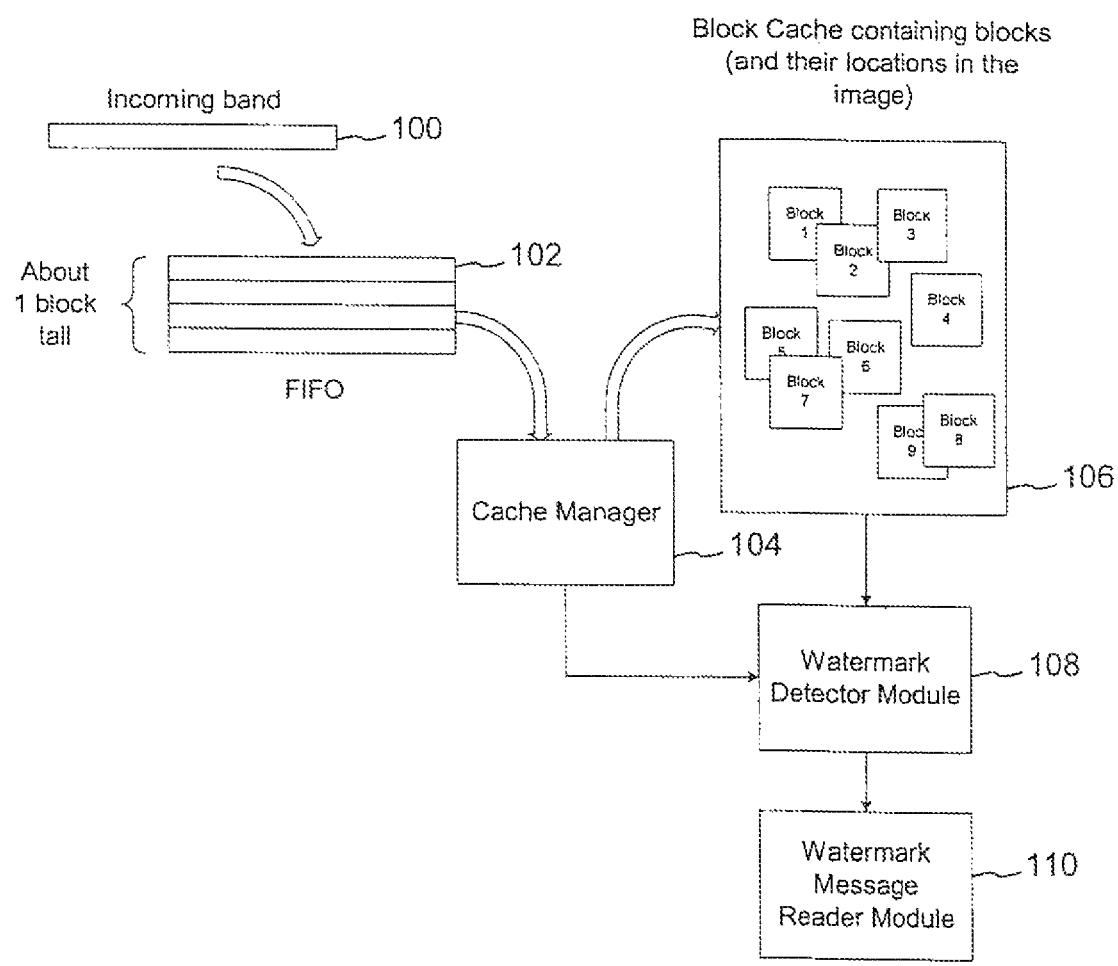
FIG. 1 is a diagram of a streaming mode watermark decoder.

FIG. 1 is a diagram of a streaming mode watermark decoder. The streaming mode watermark decoder processes incoming portions of an image to detect the presence of a watermark, and read a message encoded in the watermark. The detector intercepts and buffers portions of image data as it is being transferred. The buffer holds a most recently received portion of the image. It analyzes blocks of image data in the buffer to assess the likelihood that they include a known type of watermark. For candidate blocks that it identifies, the detector proceeds to execute watermark detection and read operations.

Looking at FIG. 1 in more detail, the decoder operates on incoming bands (100) of image data. A band is a set of contiguous scan lines of pixels in the image. The decoder temporarily stores the N most recent bands of image data in a First In-First Out (FIFO) buffer (102). The decoder selects the number N based on the height of the bands so that the FIFO holds a sequential portion of the image that is at least as high as a block of image data. A block is a unit of image data upon which the decoder performs decoding operations. The size and shape of a band and block may vary with the implementation, depending on such factors as the watermark decoding algorithm and watermark signal protocol. In a previous embedding process on the image, a watermark encoder replicates instances of a watermark signal throughout the image, and the block size is sufficiently large to enable the decoder to detect a watermark instance, and possibly recover an entire watermark message from that instance.

The format of the image data in the incoming band and FIFO vary with the implementation, depending on a number of considerations. One consideration is memory usage of the FIFO buffer. Another consideration is processing time. Another consideration is the type of image data needed to perform a decoding operation (e.g., full color information, luminance information, a binary bitmap such as a half-tone image, etc.). To save memory and processing time, the decoder may operate on down-sampled image data. In addition, rather than requiring color data per pixel, such as RGB or YUV triplets per pixel, the decoder may operate on single color channel, such as a luminance value per pixel or on half-tone, binary bitmap information. In some cases, as noted below, additional image data, such as color information is preferable over a single color channel, like luminance, because it may be used to improve the accuracy of a watermark detection and message recovery.

The decoder includes a cache manager (104) that maintains a set of image blocks from the FIFO buffer in a block cache (106). The block cache stores image data and block location information for each block. The decoder performs detection operations on the set of image blocks in this cache. To fill the cache, the cache manager analyzes image data in the FIFO and selects a set of K blocks that are likely candidates for having a recoverable watermark signal.

The criteria used to select these candidate blocks depends on the watermark embedding function and known attributes of watermarked images. The cache manager selects blocks having statistical features (signal activity, edges, colors) that make them likely candidates for having a detectable and recoverable watermark signal. In one implementation, a watermark encoder embeds an auxiliary message into a host signal by adding a perceptually adapted, pseudorandom pattern into a particular color channel of certain types of documents. This pattern is perceptually adapted such that signal intensity of the pattern increases in noisy areas of the image. The noisy blocks provide good candidates for hiding a watermark in the encoder, and for detecting and recovering a watermark in the decoder. As such, the cache manager ranks blocks based on a measure of watermark hiding and detectability characteristics. Specific measures of these characteristics include signal activity or signal energy and the quantity of edges in a candidate block.

The cache manager may also use known attributes of the types of documents containing watermarks to analyze the blocks. For example, some types of watermarks may be known to have a particular color composition. By looking at color data, the cache manager can rank blocks based at least in part on whether the colors match colors known to be in certain watermarked documents.

When adequate new blocks are available, the cache manager 104 instructs a detector module 108 to perform watermark detection functions on the K candidate blocks in the cache. The specific criteria for triggering a detection operation vary with the implementation. Some examples of the criteria include: 1) when the cache manager has identified a new candidate block or blocks; 2) when N new bands are loaded into the FIFO; 3) criteria based on attributes of watermarked images being sought (dimensions of watermarked image, colors of watermarked image, evidence of visible patterns detected in image, etc.).

Once triggered, detection stages in the detection module attempt to detect a watermark in each of the blocks, and to determine its orientation. If one is identified in a block, the detector module invokes a message reader module to perform a read operation using the orientation parameters to align image data and extracting an auxiliary message embedded in the watermark. The specific details of the detection and read operations depend on the specifics of the watermark algorithm and watermark signal protocol. Some examples of these functions are set forth in detail in U.S. Pat. No. 5,862,260, and in co-pending application Ser. No. 09/503,881, filed Feb. 14, 2000; which are hereby incorporated by reference.

Figure 2:
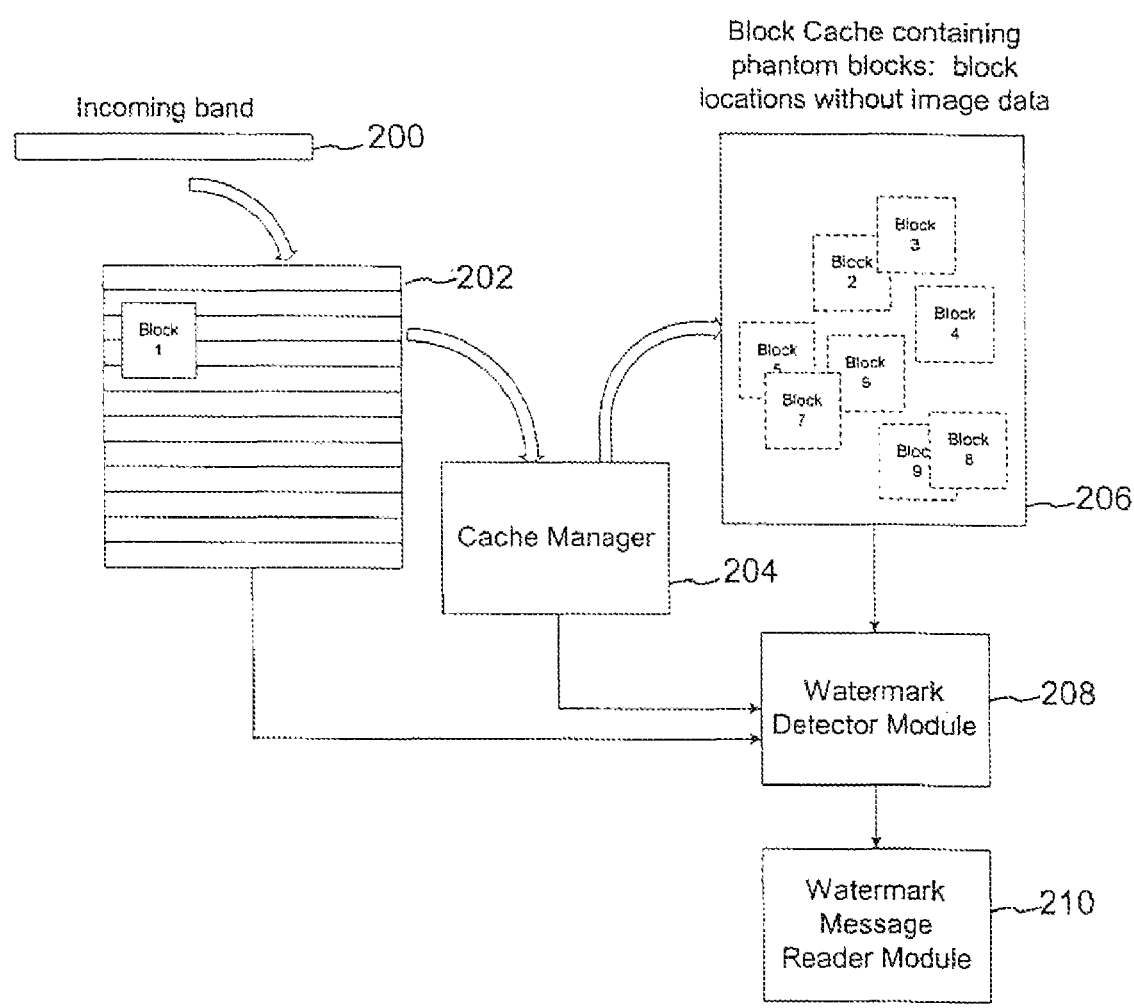
FIG. 2 is a diagram of another streaming mode watermark decoder.

FIG. 2 is a diagram of an alternative streaming mode watermark decoder. Like the decoder in FIG. 1, this one operates on sequential bands 200 of an image from another process or device. It buffers incoming bands in a band FIFO 202. The cache manager 204 analyzes image blocks in the FIFO 202, selects candidate blocks for phantom caching in a block cache 206, and triggers a watermark detector module 208 using similar criteria as described previously. The watermark detector and message reader modules (208, 210) operate in a similar fashion as the decoder in FIG. 1.

This decoder in FIG. 2 differs from the one in FIG. 1 in that the FIFO buffers additional image data and the block cache does not store image data. Instead, the cache manager maintains a phantom cache in which it maintains information about the location of each block, but the not the corresponding image data for the block. When it triggers the detector, the cache manager provides the address of the phantom cached blocks in the FIFO (e.g., a pointer) to the detector module 208. The detector module then reads the blocks from the band FIFO directly, rather than reading them from the block cache as in the decoder shown in FIG. 1.

FIG. 3 is a diagram of a streaming mode encoder. The streaming mode encoder receives incoming, sequential bands 300 of an image. It buffers these bands in a band FIFO 302 that is at least one block in height. A block in the context of image watermark encoding refers to the size of image data into which a watermark encoder module embeds an entire watermark signal instance. The FIFO includes two separate buffers, enabling the embedder to load one with incoming data while performing embedding operations on image blocks in the other one.

When one of the band FIFOs is filled with new image data, a perceptual analyzer 304 analyzes the pixel data in the block to compute a perceptual mask. In one implementation, this perceptual mask is an array of watermark gain control values used to modulate the strength of corresponding samples in an image watermark signal. Each gain control value corresponds to an element or group of neighboring elements in the spatial domain of a watermark signal. The gain control values are computed as a function of the corresponding samples in the host image being watermarked. In particular, they are a function of the local signal activity (e.g., local contrast and image signal edge measurements). For more information about computing a perceptual mask, see U.S. patent application Ser. No. 09/596,698, filed on Jun. 19, 2000, and entitled Perceptual Modeling of Media Signals Based on Local Contrast and Directional Edges; and Ser. No. 09/503,881, filed Feb. 14, 2000 (now U.S. Pat. No. 6,614,914).

Separately, the watermark encoder prepares an auxiliary message 306 for encoding into the image. The message is comprised of a set of binary or M-ary symbols. In this implementation, the message is repeated in each block. However, it is possible to vary the message over different parts of an image by changing the message input to the watermark encoder.

The message coding module 308 transforms the message into a watermark message signal. This process includes adding control bits to the message (fixed codes that assist in aligning the image, and error detection symbols derived based on the other message symbols). It also includes error correction encoding, such as using convolution, BCH, Reed Solomon, turbo codes, etc. Finally, it includes a spread spectrum modulation function in which the error corrected message symbols are spread over a pseudo random carrier image. In particular, the encoder spreads each binary symbol of the error correction encoded message over a pseudorandom number using a spread spectrum modulator (e.g., XOR for binary symbols, multiplier for binary antipodal symbols), and the resulting binary signal elements are mapped to locations in the host image block.

A watermark embedding function 310 embeds the watermark message signal into the host signal, using the perceptual mask from the perceptual analyzer to modulate the signal intensity. There are a variety of watermark embedding functions detailed in watermarking literature, including patents and other publications. The embedding function may modulate spatial domain pixel values in a selected color channel (e.g., chrominance or luminance), or modulate frequency coefficients such as wavelet, Fourier, DCT transform coefficients, etc. The embedding function may modulate signal amplitudes or some other statistical feature such that that feature corresponds to a desired message signal element to be encoded. In one implementation, the embedding function modulates amplitudes of spatial pixel values in the luminance channel. Selected pixels are adjusted up, while others are adjusted down corresponding to a corresponding element in the watermark message signal.

In addition, in some applications where the watermarked signal is expected to survive geometric transformation, the watermark embedding function also embeds a watermark orientation signal (also referred to as a calibration or synchronization signal). This signal comprises an array of impulse functions that form peaks in the Fourier Magnitude domain of the image block. The impulse functions have pseudorandom phase to make them imperceptible or nearly imperceptible, yet their known phase enables the watermark detector module to compute the origin (e.g., the vertical and horizontal offset or translation) of the watermark signal in a distorted version of the watermarked image. The detector module correlates the orientation signal with a log polar remapping (Fourier Mellin transform) of the watermarked signal to determine rotation and scale parameters of the watermark signal in a distorted version of the watermarked signal. The watermark, including the orientation signal, is imperceptible or substantially imperceptible in the watermarked signal.

The streaming mode encoder transfers watermarked blocks 312 into another FIFO buffer 314. This FIFO is also double buffered, enabling the embedding function to fill one FIFO, while transferring bands from the other buffer to the next stage in the printing or scanning process in which the streaming mode encoder is incorporated.

The watermark systems depicted in FIGS. 1-3 can be implemented for a variety of different applications and watermarking algorithms. This architecture is particularly well suited for incorporating watermark decoder functionality into a printer or scanner driver. In both cases, the driver is a software interface to a peripheral device, namely a scanner or printer, or a device that includes both image scanning and printing subsystems such as a fax machine or copier. The driver executes on a processor in a computer connected to the peripheral device. The driver enables application programs executing in the computer, including the operating system, to communicate with the peripheral. The application program communicates data and instructions to the driver via a programming interface, sometimes referred to as an API. The driver communicates hardware specific instructions and data to and from the peripheral.

Typically, these types of software drivers only pass sequential portions of an image to or from the peripheral during printing or scanning operations. As such, a streaming mode watermark architecture is particularly well suited for performing watermark functions on a sequential stream of image data as it is being transferred between the driver and peripheral.

The streaming mode architecture is also well suited for use within printer or scanner devices, including multi-function devices like fax machines, copiers, and integrated copier, fax machine, printer and scanner devices. Many of these devices have internal processors and memory that manage the internal operations of the imaging device. For example, to manage printing operations, such devices include a combination of software, hardware, and firmware.

In typical printing process, an image passes through a number of stages referred to as the printer pipeline. This pipeline may be implemented in a driver, in the printer, or in some combination of the driver or printer device. The printer pipeline typically includes a raster module and a render module. The input to the pipeline is either text or an image. Images are commonly input in a standard digital image format, such as array of RGB and YUV pixels. The raster module performs image processing functions like stretching, anti-aliasing to convert the image into a desired size and resolution. The render module then takes the rasterized image and coverts it into a binary bitmap (e.g., halftone format) for printing. For color printing, the render module performs a color mapping to the color format of the printer, such as a CMYK representation, where each color channel has a corresponding binary bit map or half tone representation.

The streaming mode architecture is well suited for the printer pipeline within a printer device or driver because various stages of the pipeline operate on and pass sequential portions of the image to subsequent stages. To incorporate watermark functionality, a watermark module intercepts sequential portions of image data at a selected stage in the pipeline and applies the watermark function.

Within a printer, for example, a watermark function may be applied to sequential portions of the image as it enters the rasterizing stage, as it enters the rasterizing phase, or as it exits the rasterizing stage.

The streaming mode architecture is also suited for scanner pipeline within a scanner device or driver. The scanner pipeline receives an image as it is being captured via an image sensor. The scanned image data typically gets color mapped into a standard form such as RGB or YUV and sent in sequential portions to another processing stage or device. A watermark function may be applied to the sequential portions of an image as it is captured from the image sensor or after it is color mapped.

The incorporation of a streaming mode watermark encoder or decoder in printer and scanner drivers has a number of advantages. One advantage is that it enables the watermark functionality to operate in a manner that is independent of the application program that utilized the driver to send or receive image data from an imaging peripheral.

There are a number of design issues relating to incorporating watermark functions in drivers and imaging devices. One issue in drivers compatible with the Windows operating system is the software code format. Many drivers are written in 16 bit code. Such drivers may require "thunking" across a 16 to 32 bit boundary in cases where the streaming mode watermark function is written in 32 bit format.

One of the implementations of the invention includes 32 bit streaming mode watermark function code integrated with a 16 bit printer driver compatible with the Windows 98 operating system. The printer driver calls an API of the watermark function code, which is implemented in C/C++ and compiled into a Dynamic Link Library that is linked to the printer driver at runtime. Thunking is a function call made across the 16:32 bit code boundary. The printer driver code must make a thunk to pass incoming image bands of RGB data and related image data (such as image dimensions) to the watermark function API. The implementation minimizes the performance impact of this thunk by using a 16:32 bit bridge to the 32 bit watermark function code to pass the image band data. In particular, the bridge employs simple data structure types that include only band and image data necessary to perform the watermark function. The bridge includes assembly code to ensure that the 32 bit code correctly addresses memory that is accessed using 16 bit pointers in the 16 bit driver.

The implementation employs a thunk to pass image band data to the watermark function through its API. The API avoids a thunk back to the 16 bit code to return the results of the watermark function by filling in 16 bit parameters in the 16 bit code. These parameters represent the results of a watermark detection and read operation for a watermark decoder function.

Another implementation issue is the image data model used to represent the sequential stream of image data. In a printer driver implementation for the Windows 98 operating system, the image data model adheres to the data model established by the GDI module in the operating system. In a scanner driver implementation, the image data model adheres to the Twain Data Source standard for scanners.

Another design issue that applies to implementations in drivers or devices is where to intercept the image data in the scanning and printing process. The printer driver implementation described above intercepts bands of RGB data from the driver before the rasterizing and rendering processes in the printer pipeline. This interception point enables the watermark code to hide its latency within the latency of the subsequent rasterizing and rendering process. As an alternative, the watermark function can also intercept RGB bands of image data after the rasterizing process but before rendering, or could intercept CMYK binary bit map data after the rendering process.

Another design issue is whether to employ multi-threading in the streaming mode watermark function. Preferably the watermark function code (e.g., the watermark decoding and encoding functions) should execute on separate threads of execution so that the watermark function does not block the execution of other print or scanner pipeline processes.

Another design issue is the extent to which the watermark function retains information from watermark operations on previous blocks. For example, the watermark decoder operation can be optimized by retaining and using results from previous operations. For example, in one implementation, the detector module detects the watermark orientation signal by performing correlation (e.g., generalized match filtering) between the known orientation signal and the current image block in different transform domains, including the Fourier domain (magnitude or phase) and a log-polar resampling of the Fourier domain of the image block. Portions of an image block need not be transformed again into the Fourier domain or the log-polar resampling if they have been transformed in previous detection operations. Instead, the transformed data can be buffered in the detector module and re-used.

Additionally, the message information decoded from different blocks can be compiled to determine the embedded message symbols more accurately. For example, rather than performing error correction decoding on spread spectrum demodulated information from a single block, raw message information (i.e. message information not yet error corrected) can be compiled from several image blocks, and then periodically error correction decoded as additional message information is collected from multiple image blocks.

The geometric distortion, such as the scale, rotation, and translation, computed for previous blocks using the orientation signal is likely to be similar for other blocks. The orientation parameters for scale, rotation, translation, etc. can be used in subsequent correlation operations for additional image blocks. Rather than re-compute these parameters from scratch, the parameters for previous blocks can be used as starting points and refined in additional correlation operations.

As noted previously, there are a number of applications of the streaming mode watermark encoder and decoder functions. The encoder and decoder can operate independently or together. For example, in response to detecting a watermark or specific watermark message information with the decoder, the encoder can then be invoked to encode a watermark in the image being scanned or printed in response to the results of a streaming mode decoder operating on the image during the scan or print operation.

The watermark encoder can be used to embed tracer data in an image as it is being printed or transferred. The forensic tracer data may include: data identifying the date of an activity from a clock in the imaging device or host computer of the driver, data identifying the serial number of a computer system, data identifying a serial number of a system component, data identifying a user of the computer system, data identifying a file, data indicating the nature of a detected event, data indicating the status of the computer system, data from a registry database, data relating to an external network connection, and data derived from a digital watermark payload.

The encoder may be designed to embed this tracer data in the image in response to results of a streaming mode watermark decoding operation on the image.

The watermark decoder may be used to initiate one or more counterfeit deterrence actions such as: stopping printing or scanning, spoiling the printing or scanning output image by introducing artifacts or a visible marking like ("void", or "copy") into the image output, providing a notice to the user via a graphical user interface or audio output, etc. Preferably, the streaming mode decoder initiates one or more of these actions before the printing or scanning operation has completed. Such an action can be triggered when the watermark decoder detects a predetermined event. One event is detection that the correlation between the known watermark orientation signal and the watermarked image exceeds a threshold. Another event is accurately decoding a watermark message as determined by checking error detection symbols relative to other symbols in the watermark message.

The watermark decoder may also be used to initiate actions on metadata associated with the image via the watermark embedded in it. Because these actions are triggered from a streaming mode decoder, they can be performed during the printing or scanning of the image. The metadata may be included in the watermark message payload, or referenced via an identifier in the watermark message payload. The decoder may trigger the rendering of the metadata, which includes presenting graphical, image, video or audio data on a user interface or executing program instructions in the metadata.

The metadata may be stored in a database in the imaging device or in another device accessible to the imaging device or system via a wire or wireless network connection (wireless phone network, Internet, LAN, etc.). The watermark message may include an address, index, or URL. The decoder may trigger a programmatic process to fetch related information or program instructions from that address, index, or URL. For example, the decoder may fetch a web page stored at the URL or provide the URL to another application program, such as an Internet browser, for fetching and displaying a web page at the URL. Alternatively, the decoder may send the index to a database, which in turn, provides corresponding information or instructions back to the decoder. The database record matching the index may include yet another reference to information or instructions, such as a URL to a related web site. The database (e.g., web server) may either return this information to the decoder or route it to another device (e.g., web server), which in turn returns related information or instructions to the decoder (e.g., computer or imaging device where streaming mode decoder is executing). For related information on such applications for using watermarks to link watermarked content to information or actions, see U.S. Pat. No. 5,841,978 and U.S. application Ser. No. 09/571,422 (now U.S. Pat. No. 6,947,571); Ser. No. 09/563,664 (now U.S. Pat. No. 6,505,160); and Ser. No. 09/574,726.

The watermark encoder may be implemented to include a user interface to enable the user to control whether an image is watermarked while being printed or scanned, and to specify the information to be embedded in the watermark. For example, the watermark encoding functionality may be selected via the printer or scanner dialog box of the printer or driver software. In this dialog box, the user can enter alpha-numeric text for encoding in the image as it is being scanned or printed. For example, the user can enter a reference to an electronic version of the image being printed or scanned before it is printed or scanned. Additionally, the user can enter a reference to other information, such as a database record, a URL, a program, or other related information or data. The user can, for example, insert a reference to a licensing web page, or usage control information. A compatible decoder can then automatically trigger actions, such as rendering the metadata associated with the watermark message during subsequent printing or scanning operations on the image.

The watermark decoder may also have a user interface to enable the user to control watermark decoding, to apprise the user of decoding results, and to render metadata (information or programs) associated with an image via a watermark.

The watermark decoder can be further enhanced by combining it with additional modules for detecting visible patterns used in counterfeit deterrence, such as visible patterns of shapes used on bank notes. The pattern recognition module or modules can be spawned on separate threads yet operate on the same image data in the FIFO buffer as the watermark decoder. In the event that the pattern recognition module detects a predetermined pattern of a bank note or other secure document it triggers an action, such as inhibiting the print or scan process before it completes, informing the user, linking to a database or web site, etc. For more information on pattern recognition modules, see co-pending application 60/176,693, filed Jan. 18, 2000, and entitled Multistage Detection of Geometrical Structures or Patterns, which is incorporated by reference.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the watermark encoding processes may be implemented in a programmable computer or a special purpose digital circuit. Similarly, watermark decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. An apparatus comprising:
   memory configured to buffer streaming content representing a media signal;
   one or more processors configured to:
      select certain portions of the buffered streaming content based on predetermined criteria, wherein the predetermined criteria comprises one of signal energy or color information;
      detect steganographic indicia from selected portions of streaming content; and
      carry out an action based at least in part on detection of the steganographic indicia.

2. The apparatus of claim 1, wherein the media signal comprises an image, audio or video and the criteria comprises a noisy signal.

3. The apparatus of claim 1, wherein the steganographic indicia comprises digital watermarking.

4. The apparatus of claim 1, further comprising ranking buffered portions in terms of their steganographic indicia detectability.

5. The apparatus of claim 1, wherein the action comprises accessing metadata associated with the media signal or steganographic indicia.

6. The apparatus of claim 1, wherein steganographic indicia detection is performed in association with a device driver as the media signal is passed from an application program to a device, wherein the device driver includes 16 bit code, wherein the steganographic indicia detection is implemented in 32 bit code, and wherein the steganographic indicia detection is invoked from the 16 bit code through an application programming interface of the 32 bit code.

7. The apparatus of claim 6, wherein the 16 bit code passes data to the 32 bit code over a 16 to 32 bit bridge, and wherein the bridge comprises code enabling the 32 bit code to access data structures in the 16 bit code.

8. An apparatus comprising:
   memory configured to buffer a streaming media signal;
   one or more processors configured to:
      rank buffered portions of the media signal in terms of their ability to hide steganographic indicia;
      detect steganographic indicia from relatively higher-ranked portions of the streaming media signal before attempting to detect from relatively lower-ranked portions; and
      carry out an action based at least in part on detection of the steganographic indicia.

9. The apparatus of claim 8, wherein portions are ranked based on a relationship with characteristics associated with steganographic indicia.

10. The apparatus of claim 8, wherein portions are ranked based a predetermined signal criteria.

11. The apparatus of claim 8, wherein steganographic indicia detection is performed in association with a device driver as the media signal is passed from an application program to a device, wherein the device driver includes 16 bit code, wherein the steganographic indicia detection is implemented in 32 bit code, and wherein the steganographic indicia detection is invoked from the 16 bit code through an application programming interface of the 32 bit code.

12. The apparatus of claim 11, wherein the 16 bit code passes data to the 32 bit code over a 16 to 32 bit bridge, and the bridge includes code enabling the 32 bit code to access data structures in the 16 bit code.

13. The apparatus of claim 8, wherein the action comprises accessing metadata associated with the media signal or the steganographic indicia.

14. The apparatus of claim 8, wherein the action comprises communicating at least a portion of the steganographic indicia to a network resource.

15. The apparatus of claim 8, wherein the steganographic indicia comprises digital watermarking.

16. The apparatus of claim 1, wherein buffered selected portions represent audible portions or video picture portions of the streaming content.

17. The apparatus of claim 8, wherein buffered portions of the media signal represent audible portions or video picture portions of the streaming media signal.

18. A method comprising:
   buffering streaming content representing a media signal;
   selecting, using a processor, certain portions of the buffered streaming content based on predetermined criteria, wherein the predetermined criteria comprises one of signal energy or color information;
   detecting steganographic indicia from selected portions of streaming content; and
   carrying out an action based at least in part on detection of the steganographic indicia.

19. The method of claim 18, wherein the media signal comprises an image, audio or video and the criteria comprises a noisy signal.

20. The method of claim 18, wherein the steganographic indicia comprises digital watermarking.

21. The method of claim 18, further comprising ranking buffered portions in terms of their steganographic indicia detectability.

22. The method of claim 18, wherein the action comprises accessing metadata associated with the media signal or steganographic indicia.

23. The method of claim 18, wherein buffered selected portions represent audible portions or video picture portions of the streaming content.

* * * * *

UNITED STATES PATENT AND TRADEMARK OFFICE
CERTIFICATE OF CORRECTION

| | | |
|---|---|---|
| PATENT NO. | : 8,126,201 B2 | Page 1 of 1 |
| APPLICATION NO. | : 12/698651 | |
| DATED | : February 28, 2012 | |
| INVENTOR(S) | : Davidson et al. | |

It is certified that error appears in the above-identified patent and that said Letters Patent is hereby corrected as shown below:

Column 12, line 11, in Claim 10, delete "based on predetermined" and insert -- based on a predetermined --.

Signed and Sealed this
Fourth Day of September, 2012

David J. Kappos
*Director of the United States Patent and Trademark Office*